United States Patent
Ishihara et al.

(10) Patent No.: US 12,343,621 B2
(45) Date of Patent: Jul. 1, 2025

(54) VOICE USER INTERFACE PROCESSING METHOD AND RECORDING MEDIUM

(71) Applicant: Koei Tecmo Games Co., Ltd., Yokohama (JP)

(72) Inventors: Yusuke Ishihara, Yokohama (JP); Hitoshi Kadota, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 237 days.

(21) Appl. No.: 17/863,395

(22) Filed: Jul. 13, 2022

(65) Prior Publication Data

US 2023/0017974 A1 Jan. 19, 2023

(30) Foreign Application Priority Data

Jul. 14, 2021 (JP) ................................ 2021-116771

(51) Int. Cl.
*A63F 13/424* (2014.01)
*G06F 3/16* (2006.01)

(52) U.S. Cl.
CPC ............ *A63F 13/424* (2014.09); *G06F 3/167* (2013.01)

(58) Field of Classification Search
CPC ............................... A63F 13/424; G06F 3/167
See application file for complete search history.

(56) References Cited

U.S. PATENT DOCUMENTS

| | | | |
|---|---|---|---|
| 2002/0007275 A1 | 1/2002 | Goto et al. | |
| 2005/0288079 A1 | 12/2005 | Tani | |
| 2007/0097127 A1* | 5/2007 | Seo | ........................ A63F 13/327 345/473 |
| 2022/0040581 A1* | 2/2022 | Tan | .......................... G10L 15/22 |

FOREIGN PATENT DOCUMENTS

| | | |
|---|---|---|
| JP | 2000-000377 | 1/2000 |
| JP | 2000000377 A * | 1/2000 |

(Continued)

OTHER PUBLICATIONS

"I created a plugin that provides basic functions such as Android toasts, dialogues, notifications, voice recognition, and hardware volume control" , | ˙ | (Fantom)'s Development blog? [online], Oct. 9, 2017, URL: http://fantom1x.blog130.fc2.com/blog-entry-273. html Search date : Mar. 5, 2025, (w/ English machine translation), See Cite No. 8.

(Continued)

*Primary Examiner* — Jasson H Yoo
(74) *Attorney, Agent, or Firm* — MORI & WARD, LLP

(57) ABSTRACT

A voice user interface processing method executed by an information processing device, the voice user interface processing method includes determining whether a first portion of words set in advance is uttered by a player, executing a first process that corresponds to the words before the words are uttered to an end of the words in a case that it is determined that the first portion of the words is uttered, determining whether the words are uttered by the player to the end of the words in parallel to an execution of the first process, and executing a second process based on a result of determining whether the words are uttered to the end of the words.

9 Claims, 14 Drawing Sheets

(56) References Cited

FOREIGN PATENT DOCUMENTS

JP  2002-091492  3/2002
JP  2006-007368  1/2006

OTHER PUBLICATIONS

Unity-chan and Voice Recognition Rock-Paper-Scissors (Android), BOOTH [online], Sep. 11, 2019, URL: https://booth.pm/ja/items/1556879 Search Date : Mar. 5, 2025, (w/ English machine translation), See Cite No. 8.
Rock-paper-scissors game against computer, 2016 24th Signal Processing and Communication Application Conference (SIU), May 16, 2016, pp. 489 to 492, DOI: 10.1109/SIU.2016.7495784, IEEE, (w/ English abstract), See Cite No. 8.
Japanese Office Action for corresponding JP Application No. 2021-116771, Apr. 7, 2025 (w/ English machine translation).

* cited by examiner

[FIG. 1]
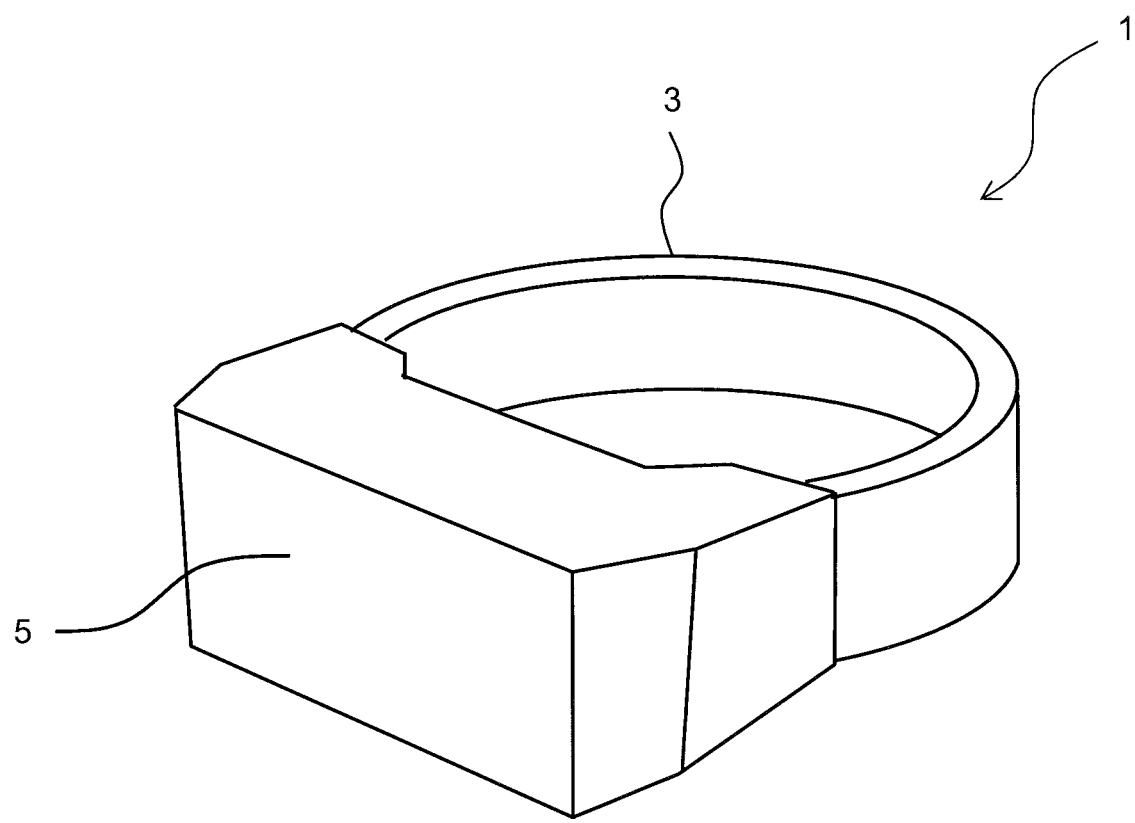

[FIG. 2]
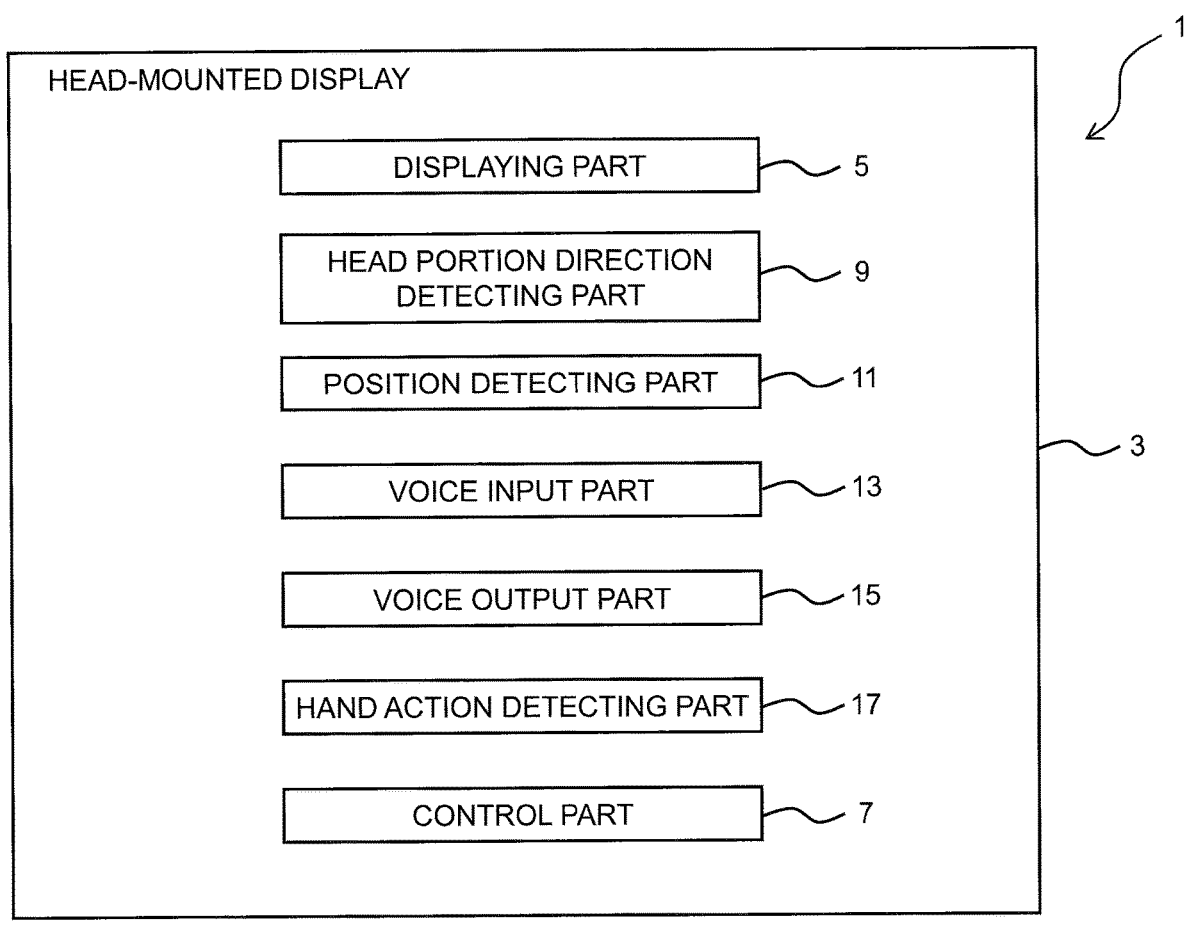

[FIG. 3]
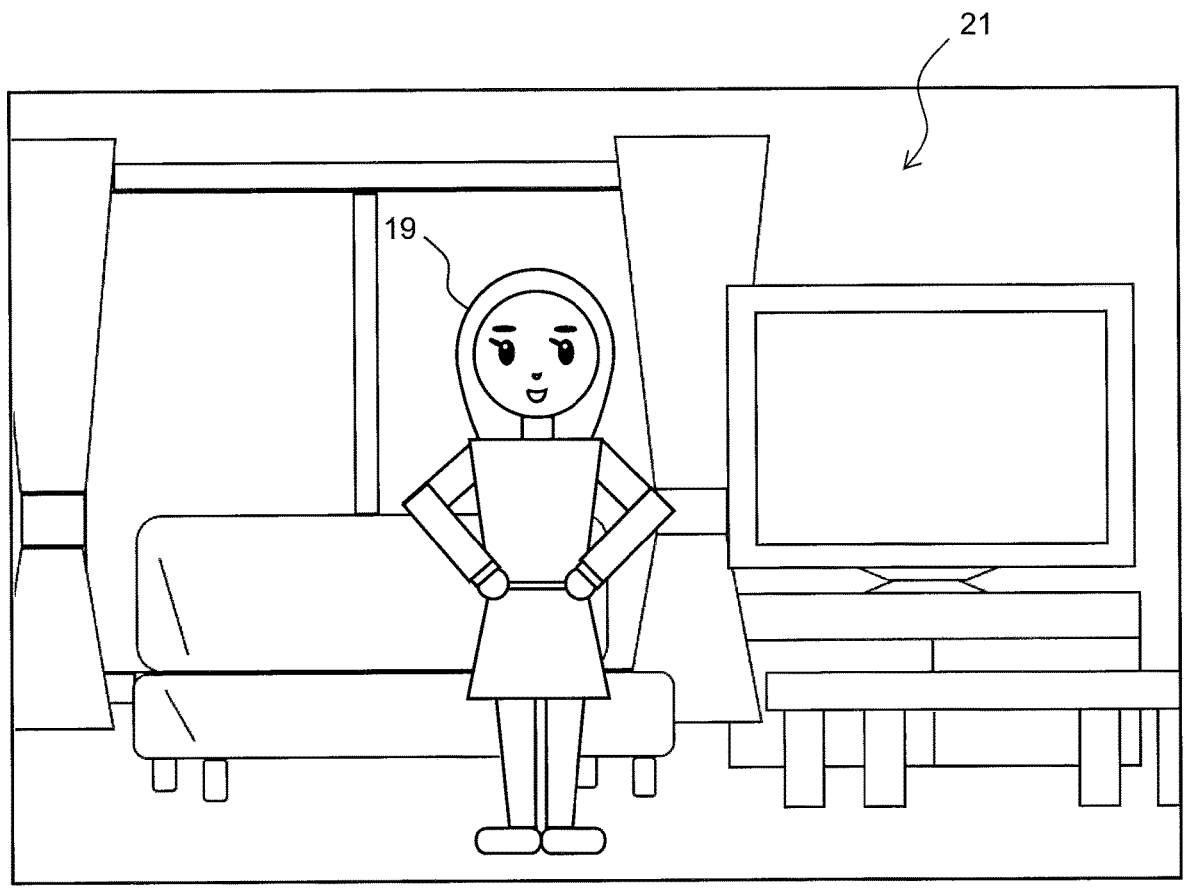

[FIG. 4]
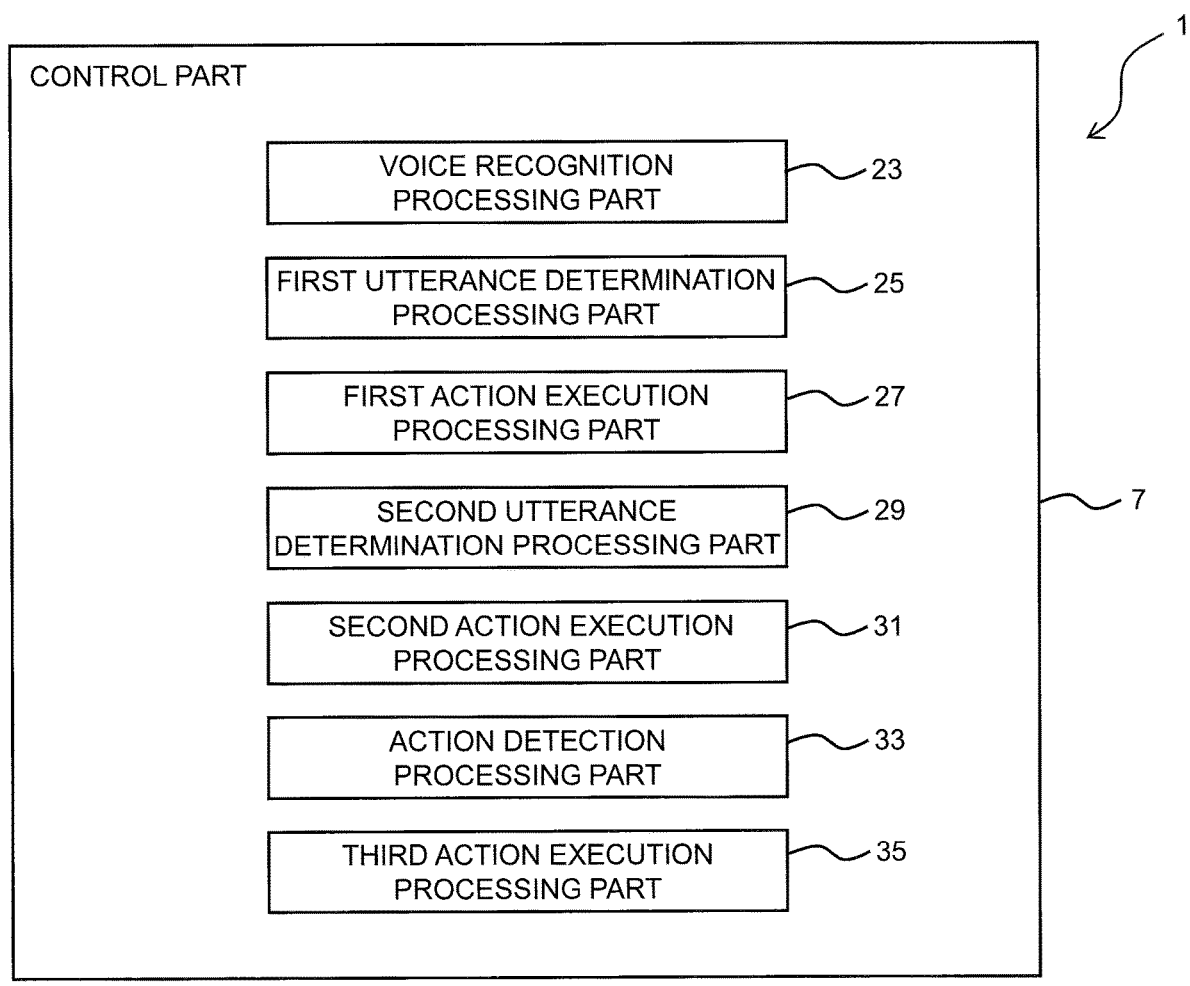

[FIG. 5A]
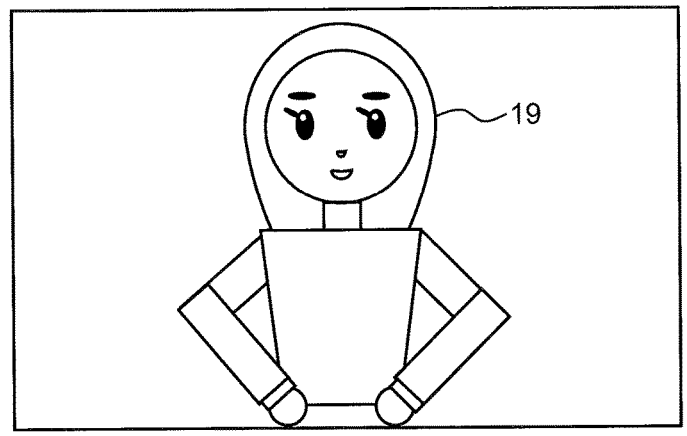
[FIG. 5B]
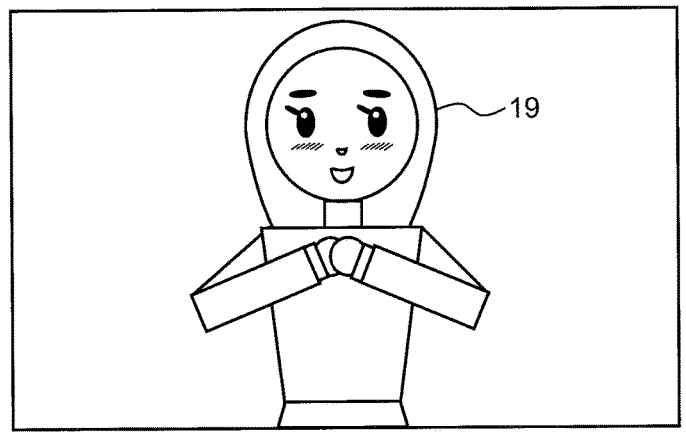
[FIG. 5C]
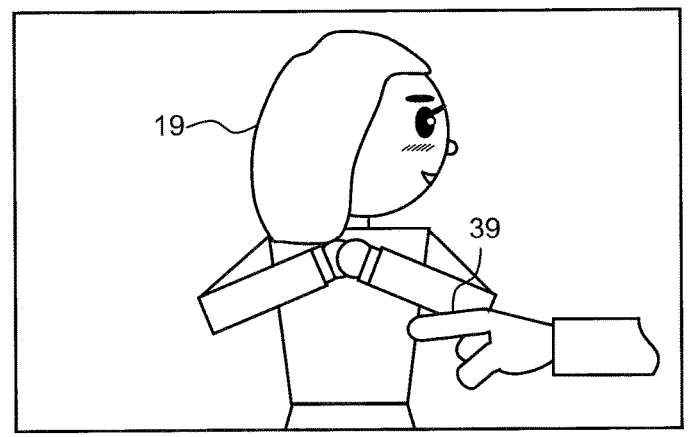

[FIG. 6A]
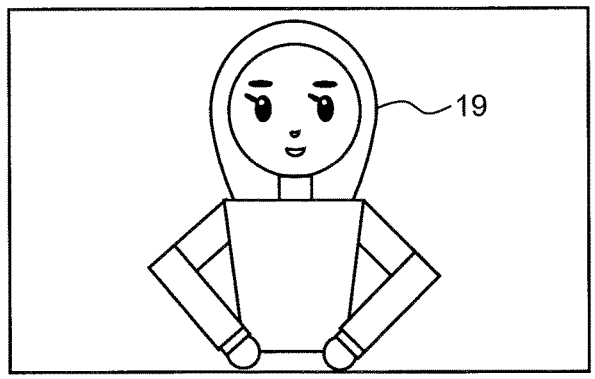
[FIG. 6B]
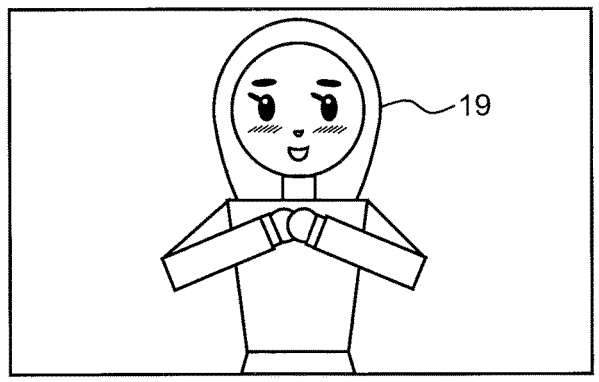
[FIG. 6C]
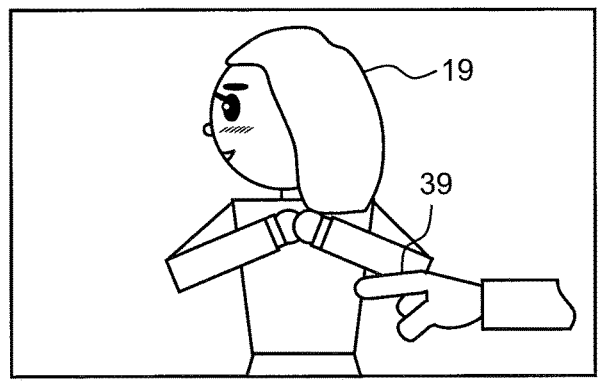
[FIG. 6D]
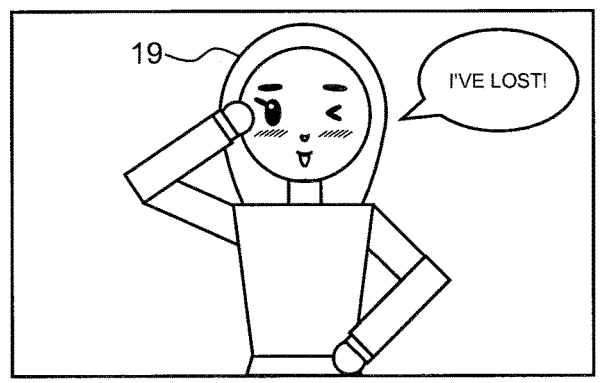

[FIG. 7A]
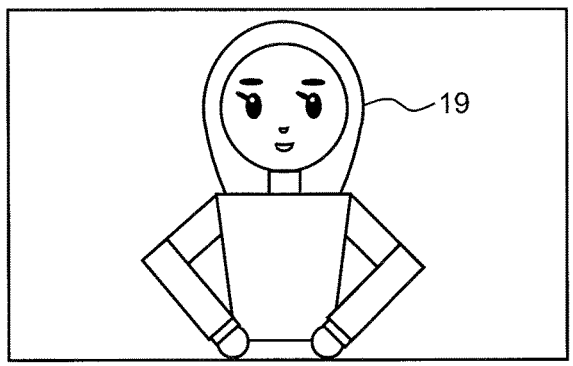
[FIG. 7B]
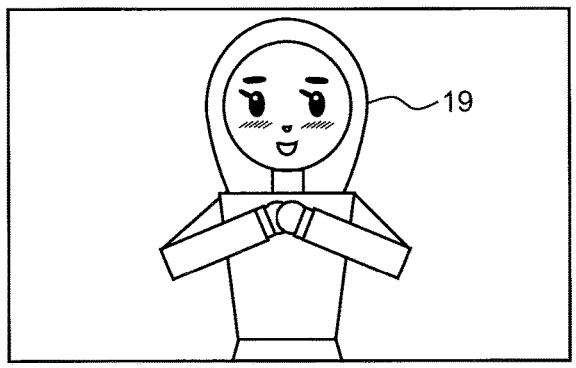
[FIG. 7C]
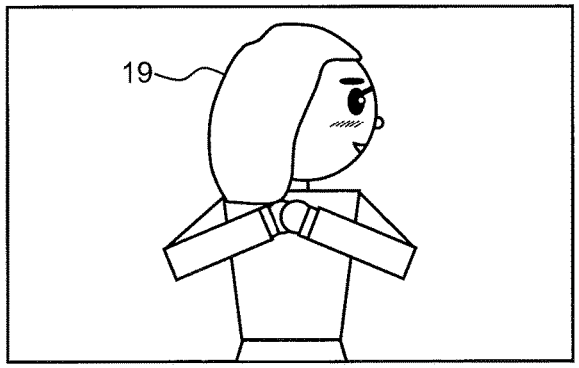
[FIG. 7D]
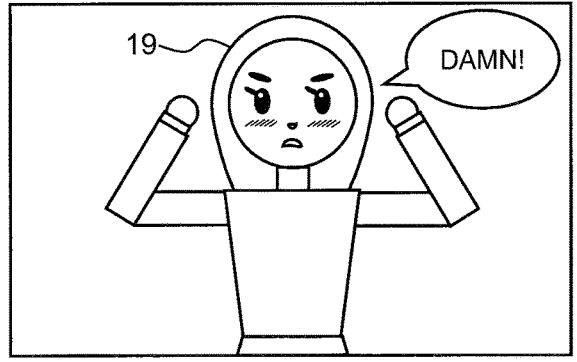

[FIG. 8A]
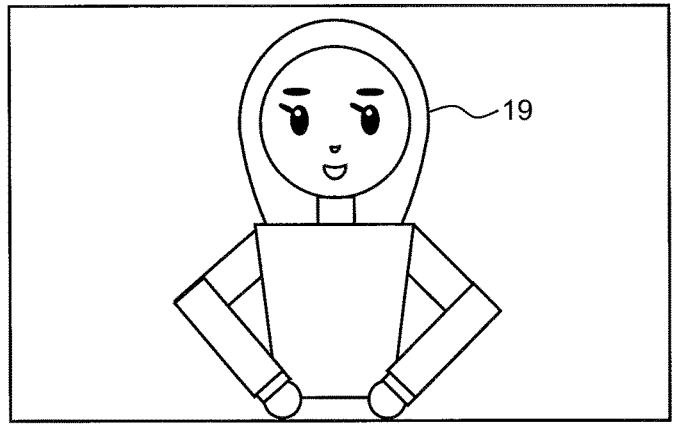
[FIG. 8B]
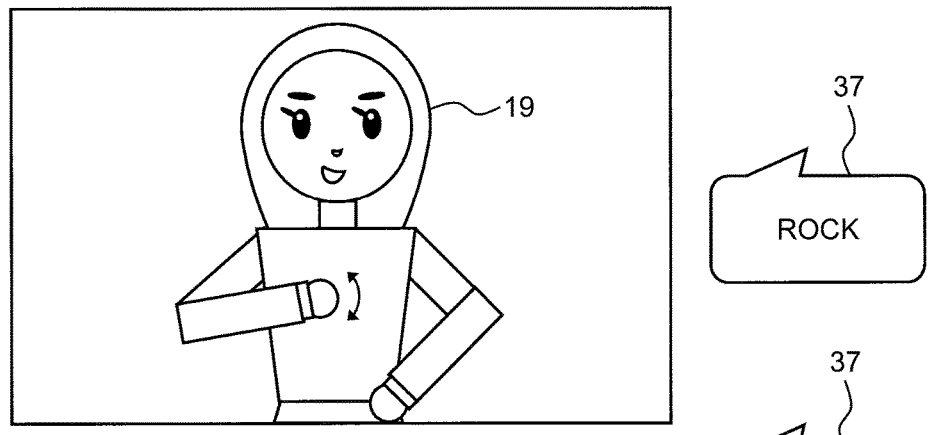
[FIG. 8C]
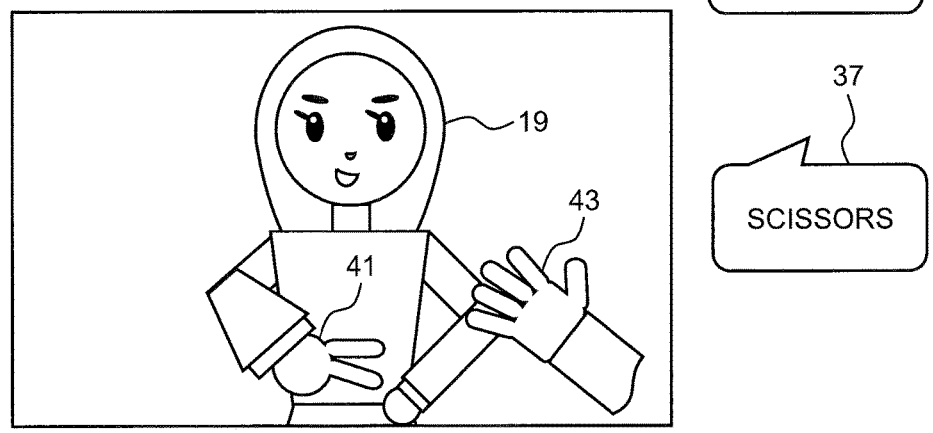

[FIG. 9A]
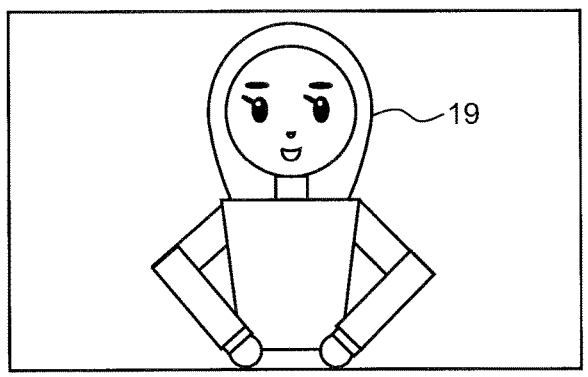
[FIG. 9B]
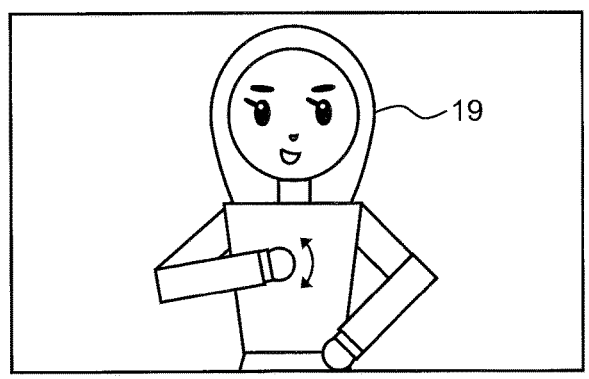
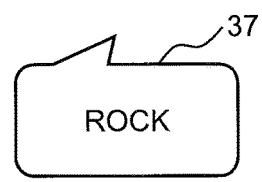
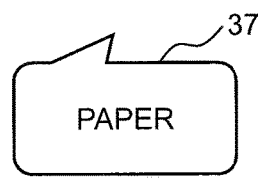
[FIG. 9C]
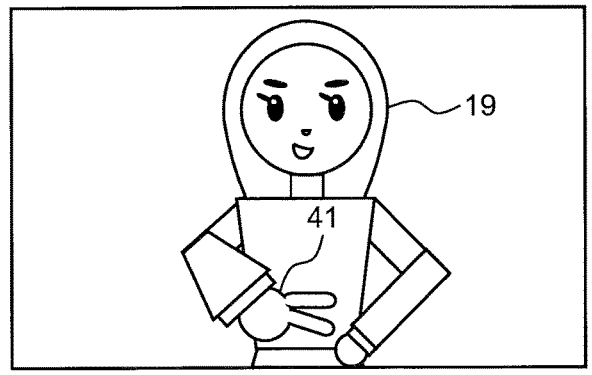
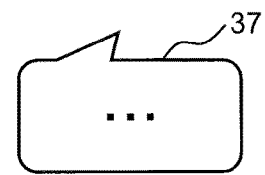
[FIG. 9D]
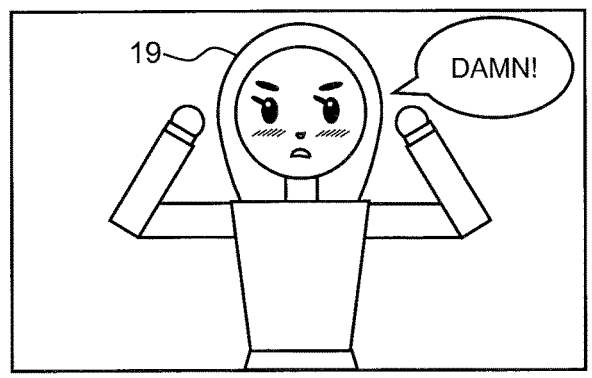

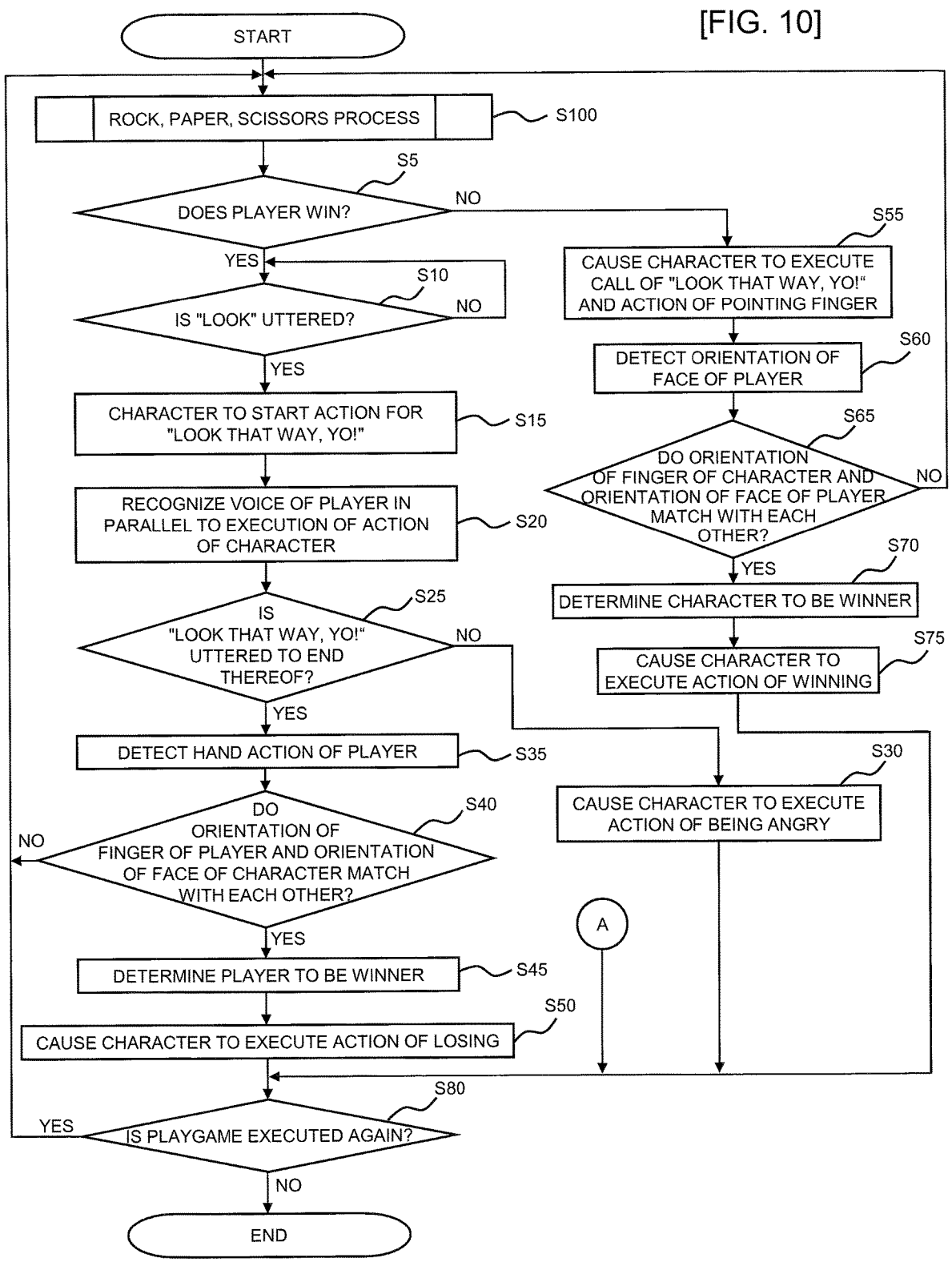
[FIG. 10]

[FIG. 11]
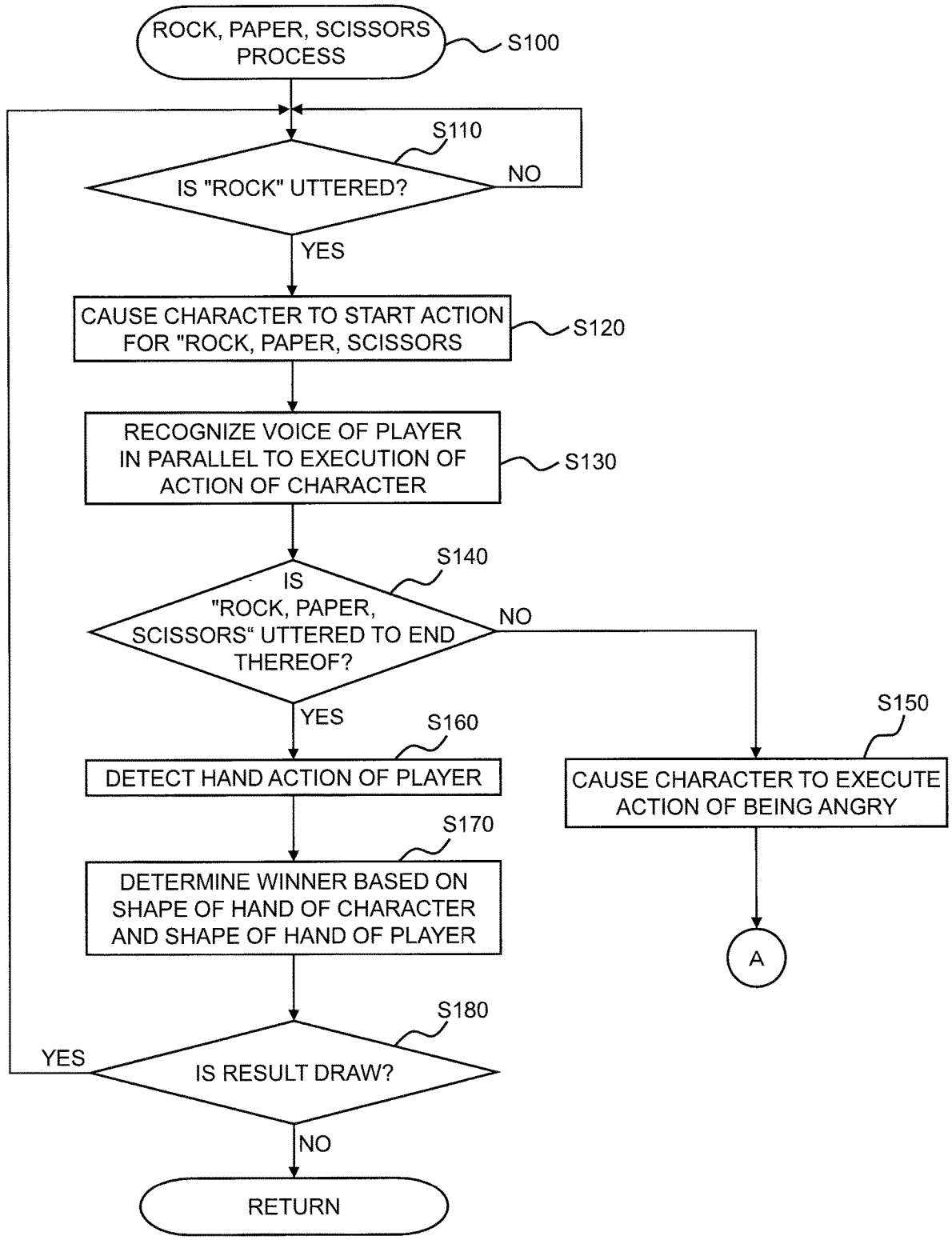

[FIG. 12]
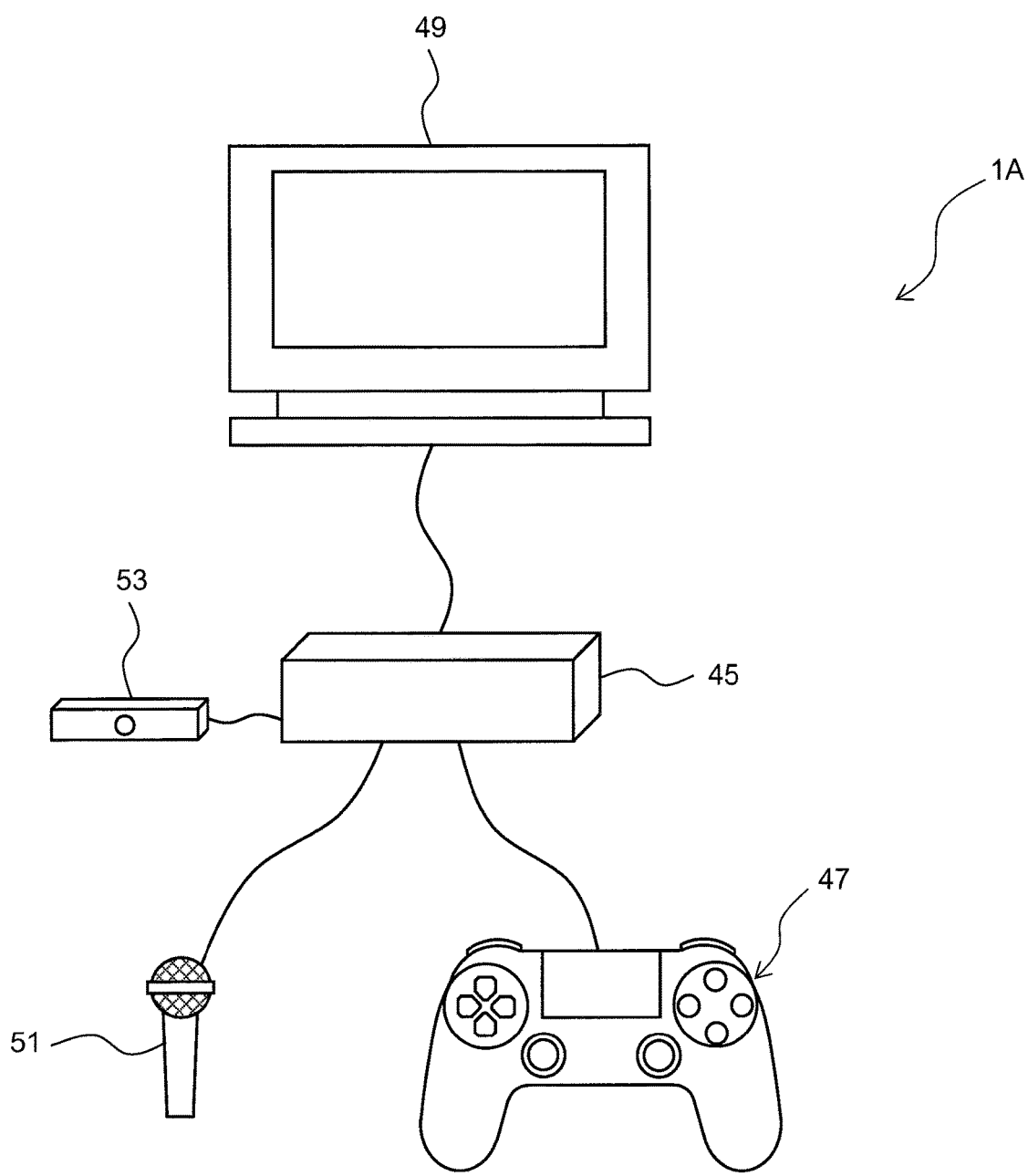

[FIG. 13]
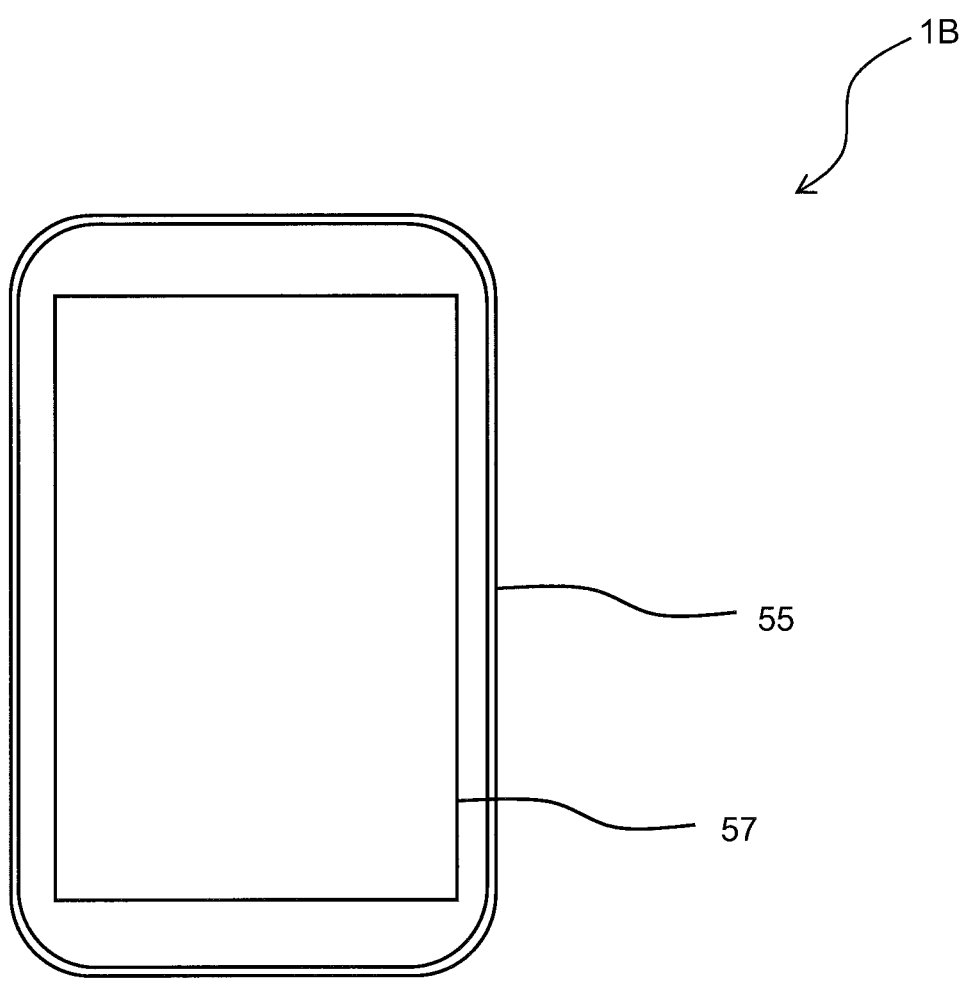

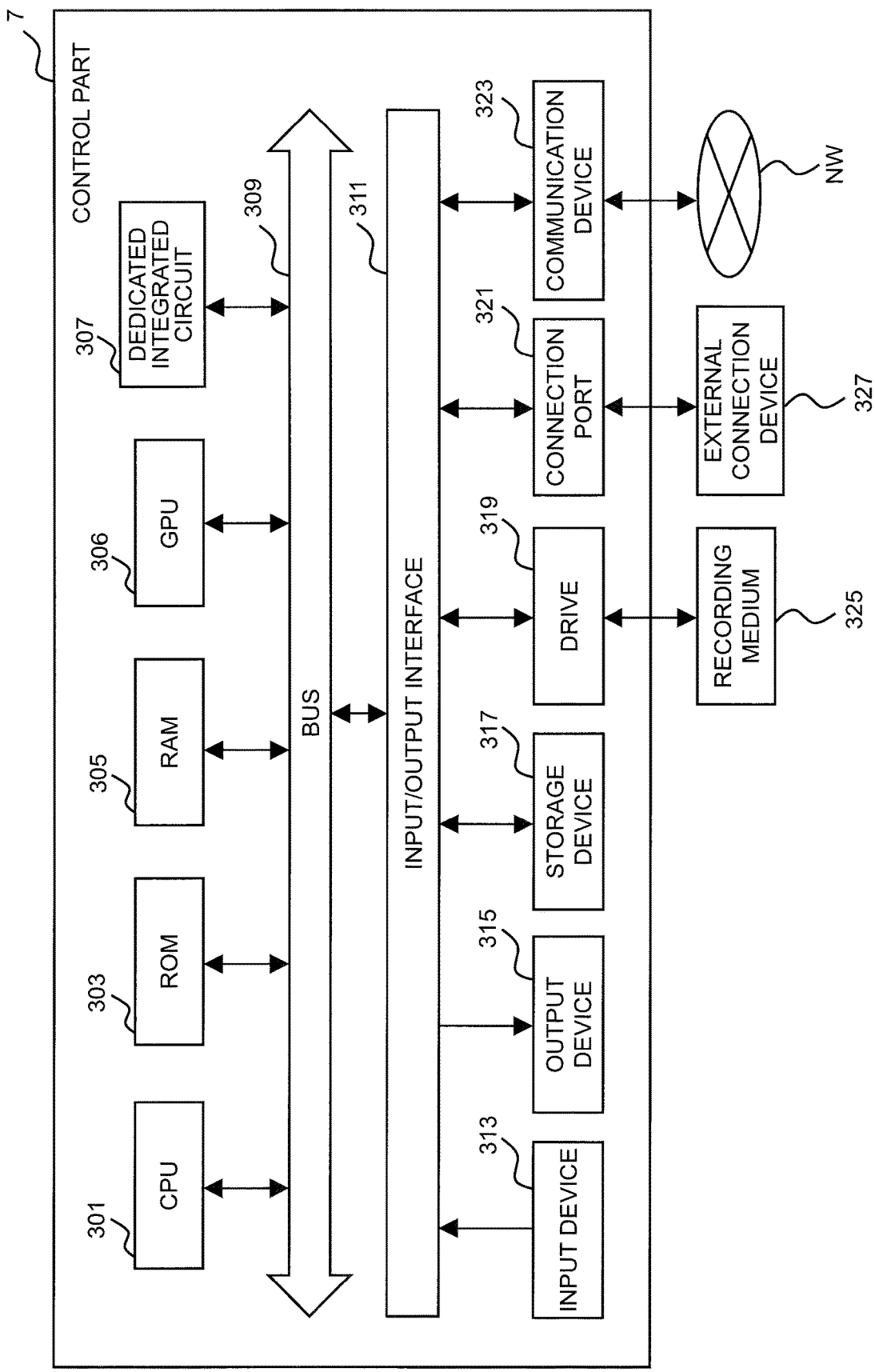
[FIG. 14]

VOICE USER INTERFACE PROCESSING METHOD AND RECORDING MEDIUM

CROSS-REFERENCE TO RELATED APPLICATION

The present application is based upon and claims the benefit of priority to Japanese Patent Application No. 2021-116771, filed Jul. 14, 2021. The entire contents of this application are incorporated herein by reference.

BACKGROUND OF THE INVENTION

Technical Field

The present invention relates to a voice user interface processing method and a recording medium.

Description of Background Art

Gaming machines each including a voice-input human interface have traditionally been known. For example, JP, A, 2000-377 describes a gaming machine with which, when a speech of a player is voice-recognized, the linguistic meaning of the speech is reflected on the next behavior of a dialogue counterpart character in the game video image to enable the player in the real world and the character in a virtual community in the in-game world to communicate with each other.

SUMMARY OF THE INVENTION

In the traditional technique, the voice uttered by the player is recognized as words and the character is caused to execute an action in accordance with the content of the recognized words. In the case of, for example, communication in which the voice and the action concurrently take place, the action of the character is delayed and the communication consequently may become unnatural.

The present invention was conceived in view of the problem and an object thereof is to provide a voice user interface processing method and a recording medium that enable natural communication to be established between a player and a game character.

Means for Solving the Problem

According to one aspect of the present invention, a voice user interface processing method executed by an information processing device, the voice user interface processing method includes determining whether a first portion of words set in advance is uttered by a player, executing a first process that corresponds to the words before the words are uttered to an end of the words in a case that it is determined that the first portion of the words is uttered, determining whether the words are uttered by the player to the end of the words in parallel to an execution of the first process, and executing a second process based on a result of determining whether the words are uttered to the end of the words.

According to another aspect of the present invention, a non-transitory recording medium readable by an information processing device, the recording medium storing a voice user interface program programmed to cause the information processing device to determine whether a first portion of words set in advance is uttered by a player, execute a first process that corresponds to the words before the words are uttered to an end of the words in a case that it is determined that the first portion of the words is uttered, determine whether the words are uttered by the player to the end of the words in parallel to an execution of the first process, and execute a second process based on a result of determining whether the words are uttered to the end of the words.

Advantages of the Invention

According to the voice user interface processing method and the recording medium of the present invention, natural communication can be established between a player and a game character.

BRIEF DESCRIPTION OF THE DRAWINGS

FIG. 1 is a system configuration diagram showing an example of the overall configuration of a game system related to an embodiment.

FIG. 2 is a block diagram showing an example of a schematic configuration of a head-mounted display.

FIG. 3 is a diagram showing an example of a game screen displayed on a displaying part of the head-mounted display.

FIG. 4 is a block diagram showing an example of the functional configuration of a control part of the head-mounted display.

FIGS. 5A-C are diagrams each showing a specific example of the game screen displayed on the displaying part of the head-mounted display in the case that a playgame of "Look that way, yo!" is played.

FIGS. 6A-D are diagrams each showing a specific example of the game screen displayed on the displaying part of the head-mounted display in the case that the playgame of "Look that way, yo!" is played.

FIGS. 7A-D are diagrams each showing a specific example of the game screen displayed on the displaying part of the head-mounted display in the case that the playgame of "Look that way, yo!" is played.

FIGS. 8A-C are diagrams each showing a specific example of the game screen displayed on the displaying part of the head-mounted display in the case that a playgame of "rock, paper, scissors!" is played.

FIGS. 9A-D are diagrams each showing a specific example of the game screen displayed on the displaying part of the head-mounted display in the case that the playgame of "rock, paper, scissors!" is played.

FIG. 10 is a flowchart showing an example of a processing steps executed by the control part.

FIG. 11 is a flowchart showing an example of detailed steps of a rock, paper, scissors process.

FIG. 12 is a system configuration diagram showing another example of the game system.

FIG. 13 is a system configuration diagram showing yet another example of the game system.

FIG. 14 is a block diagram showing an example of the hardware configuration of the control part.

DETAILED DESCRIPTION OF THE EMBODIMENTS

An embodiment of the present invention will be described below with reference to the drawings.

<Configuration of Game System>

An example of the configuration of a game system 1 related to an embodiment will first be described with reference to FIG. 1 and FIG. 2. As shown in FIG. 1, the game system 1 includes a head-mounted display 3. The game system 1 may include a game machine main body, a game controller to be operate by a player, and the like in addition to the head-mounted display 3.

The head-mounted display 3 is a displaying device that attachable to the head portion or the face portion of the player and that realizes what is known as a mixed reality (MR). The head-mounted display 3 includes a see-through displaying part 5, and the see-through displaying part 5 displays a virtual image related to a game produced by a control part 7 (see FIG. 2) superimposing this image on an image of the actual space.

As shown in FIG. 2, the head-mounted display 3 includes the displaying part 5, a head portion direction detecting part 9, a position detecting part 11, a voice input part 13, a voice output part 15, a hand action detecting part 17, and the control part 7.

The displaying part 5 includes, for example, a see-through (see-through) liquid crystal display or a see-through organic EL display, and superimposes a virtual image related to a game produced by the control part 7 as, for example, a holographic video image on an image of the actual space seen therethrough to display these images. The virtual image may be either a two-dimensional image or a three-dimensional image, and may also be either a still image or a moving image. The displaying part 5 of a non-see-through type may be employed and, for example, a virtual image produced by the control part 7 may be superimposed on an image of the actual space shot by a camera to be displayed.

The head portion direction detecting part 9 detects the angle, the angular velocity, the angular acceleration, and the like of the head portion of the player to detect the orientation of the head portion (the orientation of the face) based on the result of the detection. The orientation of the head portion may be detected as a direction (a vector) in a resting coordinate system of the actual space produced by a space recognition process of recognizing the actual space around the player using, for example, a depth sensor and a camera. The detection method for the direction of the head portion is not especially limited and various detection methods therefor can each be employed. For example, an acceleration sensor or a gyroscope sensor may be disposed on the head-mounted display 3 and the control part 7 may calculate the direction of the head portion of the player based on the result of the detection by these sensors.

The position detecting part 11 detects the position of the head portion of the player. The detection method for the position of the head portion is not especially limited and various detection methods therefor can each be employed. For example, a method may be employed according to which a camera and a depth sensor are disposed at each of plural points around the head-mounted display 3, the depth sensors are caused to recognize the space around the player (the actual space), and the control part 7 recognizes the position of the head portion of the player in the surrounding space based on the result of the detection by the plural cameras. For example, a camera may be disposed on an external portion of the head-mounted display 3 and a mark such as a light emitting part may also be disposed on the head-mounted display 3 to detect the position of the head portion of the player using this external camera.

The voice input part 13 includes, for example, a microphone, and inputs the voice uttered by the player and other external sounds. The control part 7 recognizes the input voice of the player as words using a voice recognition process and executes a predetermined process based on the recognized words.

The voice output part 15 includes, for example, speakers and outputs sounds to the ears of the player. For example, a voice uttered by the character, sound effects, and BGM are output.

The hand action detecting part 17 includes, for example, a camera or an infrared sensor, and detects the shape and actions of each of the hands of the player as hand actions. The control part 7 executes a predetermined process based on the detected hand actions.

The control part 7 executes various types of process based on the detected signals of the various types of sensors and the voice inputs. The various types of process include, for example, an image display process, a position detection process, a space recognition process, a voice recognition process, a voice output process, and a hand action detection process. In addition to these, the control part 7 may be able to execute wide range of processes. The control part 7 produces or varies a virtual image to be displayed on the displaying part 5 to express the mixed reality (MR), based on the results of the processes executed by the head portion direction detecting part 9, the position detecting part 11, the voice input part 13, the voice output part 15, the hand action detecting part 17, and the like of the head-mounted display 3.

<Schematic Content of Game>

In this embodiment, description will be made for the case that the control part 7 executes a game program that is an example of a voice user interface program and a game processing method that is an example of a voice user interface processing method. Description will thereafter be made for an example of the schematic content of a game presented by execution, by the control part 7, of the game program and the game processing method of this embodiment.

The game related to this embodiment enables a player to communicate with a virtual game character who seems to be present in the actual space by superimposing an image of the game character on an image of the actual space. Actions and behaviors of the game character vary in accordance with various types of operational input by the player (such as an action of the head portion, an action of a hand, and a voice input). The type of the game character is not especially limited and is however typically a human male character or a human female character. The game character may be a character of an animal other than the human, a character of a virtual creature other than the human and any animal, or a character of a robot or a physical substance (that is a what-is-called object) other than any creature.

FIG. 3 shows an example of a game screen. In this example, a female game character 19 is displayed being superimposed on an image 21 of, for example, a room of the player that is the actual space.

In this embodiment, the player and the game character 19 execute communication for at least a portion of voices and actions to be concurrently executed. Details of the processing will be described below for the case that playgames each for the player and the game character 19 to compete to win such as, for example, "Look that way, yo!" and "rock, paper, scissors", as an example of the communication.

<Functional Configuration of Control Part>

An example of the functional configuration of the control part 7 of the head-mounted display 3 will be described with reference to FIG. 4.

As shown in FIG. 4, the control part 7 (an example of an information processing device) includes a voice recognition processing part 23, a first utterance determination processing part 25, a first action execution processing part 27, a second utterance determination processing part 29, a second action execution processing part 31, an action detection processing part 33, and a third action execution processing part 35.

The voice recognition processing part 23 converts a voice of the player input by the voice input part 13 into a corresponding text (a character string). For example, the voice recognition processing part 23 analyzes the voice using, for example, a frequency analysis, recognizes the phonemes using a voice recognition dictionary (such as an acoustic model, a linguistic model, and a pronunciation dictionary), and converts the voice into the text. Techniques such as machine learning and deep learning may be used in the voice recognition process.

The first utterance determination processing part 25 determines whether the first portion of the words set in advance is uttered by the player, based on the text converted by the voice recognition processing part 23. "The words set in advance" are not especially limited only when the words represent the communication for at least a portion of voices and actions to be concurrently executed between the player and the game character. For example, the words set in advance may be, for example, words that represent a playgame in which the player and the game character compete to win. The words are, for example, "Look that way, yo!" or "rock, paper, scissors". "The first portion" is, for example, "Look - - -" or "Look that - - -" for the words of "Look that way, yo!". The first portion is, for example, "rock - -" or "rock, paper - - -" for the words of "rock, paper, scissors". These are each an example, and a portion different from each of these may be extracted to be used as the first portion.

In the case that the words set in advance have variations in their expression in accordance with the region, the age, and the like, the words may be set to include the variations.

In the case that the first utterance determination processing part 25 determines utterance of the first portion of the words, the first action execution processing part 27 (an example of a first process execution processing part) executes a first process that corresponds to the words before the words are uttered to the end thereof. For example, the first action execution processing part 27 causes the game character to start a first action that corresponds to the words as the "first process". In the case that the words are, for example, the words representing a playgame, "the first action that corresponds to the words" is an action for the playgame. In the case that the words are, for example, "Look that way, yo!", the "first action that corresponds to the words" is a preparatory action corresponding to the portion "Look that way" (such as, for example, an action of keeping rhythm by swinging the face or the body, or an action of waiting for the finger pointing. An action of starting moving the face in an orientation may be employed) and an action of moving the face in any one of an upward direction, a downward direction, a rightward direction, and a leftward direction, that corresponds to the portion "yo!". The first action execution processing part 27 therefore causes the game character to start the preparatory action at the timing of the utterance of, for example, "Look" by the player. The direction to move the face in may, for example, be randomly determined or may, for example, be determined with the personality, the ability, and the like of the game character reflected thereon.

The first action includes the preparatory action and the action of moving the face, and the timing of switching therebetween may be set such that the switching is executed at, for example, a fixed timing that corresponds to the general speed of uttering "Look that way, yo!". In this case, the processing can be simplified and the processing load can be reduced. The timing may also be set such that the switching is executed from the preparatory action to the action of moving the face at, for example, the timing of detecting the utterance of "way" of "way, yo!". In this case, the case, for example, that the player utters "yo!" after extending the voice as "that wa - - y" can be coped with, and the utterance of the player and the action of the game character can highly precisely be synchronized with each other.

For example, in the case of "rock, paper, scissors", the first action is a preparatory action corresponding to the portion of "rock, paper" (such as, for example, an action of keeping rhythm by swinging the hands and the arms, or an action of waiting for the player to give its hand. An action of starting forming any one of the shapes using a hand may be employed) and an action of giving a hand that forms any one shape of a rock, paper, scissors, that corresponds to the portion of "scissors". The first action execution processing part 27 therefore causes the game character to start the preparatory action at the timing of the utterance of, for example, "rock" by the player. The shape of the hand may, for example, be randomly determined or may, for example, be determined with the personality, the ability, and the like of the game character reflected thereon.

The first action includes the preparatory action and the action of giving the hand that forms the shape of rock, paper, or scissors, and the timing of switching therebetween may be set such that the switching is executed at, for example, a fixed timing that corresponds to the general speed of uttering "Rock, paper, scissors". In this case, the processing can be simplified and the processing load can be reduced. The timing may also be set such that the switching is executed from the preparatory action to the action of forming the shape using the hand to give the hand at, for example, the timing of detecting the utterance of "sci" of "scissors". In this case, for example, the case that the player utters "scissors" after extending the voice as "Ro - - ck, paper" can also be coped with, and the utterance of the player and the action of the game character can highly precisely be synchronized with each other.

The second utterance determination processing part 29 determines whether the words are uttered by the player to the end thereof, based on the text converted by the voice recognition processing part 23 and in parallel to the execution of the first action by the first action execution processing part 27. The first utterance determination processing part 25 determines whether the first portion of the words is uttered while the second utterance determination processing part 29 determines whether the overall words are uttered by the player. The determination by the second utterance determination processing part 29 continues after the game character starts the first action when the determination by the first utterance determination processing part 25 is satisfied, and is executed in parallel to the first action.

For example, in the case that the words are words representing a playgame, the second utterance determination processing part 29 determines whether the words representing the playgame are uttered to the end thereof by the player, in parallel to the execution of the action for the playgame. For example, in the case that the words are "Look that way, yo!", the second utterance determination processing part 29 determines whether the words of "Look that way, yo!" are uttered by the player to the end thereof in parallel to execution of the preparatory action and the action of moving the face of "Look that way, yo!". For example, in the case that the words are "rock, paper, scissors", the second utterance determination processing part 29 determines whether the words of "rock, paper, scissors!" are uttered by the player to the end thereof in parallel to the execution of the preparatory action and the action of giving the hand.

The second action execution processing part 31 (an example of a second process execution processing part) executes a second process based on the result of the determination by the second utterance determination processing part 29 as to whether the words are uttered to the end thereof. For example, the second action execution processing part 31 causes the game character to execute a second action that is different from the first action, as "the second process" in the case that the second utterance determination processing part 29 determines that the words are uttered not to the end thereof. "The words are uttered not to the end thereof" means the cases including the case that the player discontinues the utterance before finishing the words or that the player utters a word different from the word set in advance in the rest of the words. "The second action" is an action, or the like, that represents the reaction of the game character to the fact, for example, that the player utters the words determined in advance not to the end thereof. The second action execution processing part 31 may cause the game character to execute an action of, for example, being angry with the player, as the second action. The second action execution processing part 31 may also cause the game character to execute an action to express another emotion (such as, for example, smiling, sulking, or being sad) not limiting the second action to the action of being angry.

The action detection processing part 33 detects the action of the player. For example, the action detection processing part 33 detects which of an upward direction, a downward direction, a rightward direction, and a leftward direction the finger of the player points (an example of the action), which of a rock, a paper, and a scissors shapes the shape of the hand of the player is (an example of the action), or the like, based on the shape of the hand or the action of the player detected by the hand action detecting part 17. The action detection processing part 33 detects which of an upward direction, a downward direction, a rightward direction, and a leftward direction the face of the player is oriented (an example of the action) based on the angle, the angular velocity, the angular acceleration, and the like detected by the head portion direction detecting part 9.

The third action execution processing part 35 (an example of a second process execution processing part) executes the second process based on the result of the determination by the second utterance determination processing part 29 as to whether the words are uttered to the end thereof. For example, in the case that the second utterance determination processing part 29 determines that the words are uttered to the end thereof, the third action execution processing part 35 determines the third action based on the content of the first action executed by the game character and the content of the action of the player detected by the action detection processing part 33 and causes the game character to execute the third action, as "the second process". For example, in the case that a playgame in which the player and the game character compete to win is executed, the third action execution processing part 35 may determine the winner of the playgame based on the content of the action for the playgame executed by the game character and the content of the detected action of the player, and may cause the game character to execute a third action that corresponds to the determined winner.

For example, in the case that the player and the game character execute the playgame of "Look that way, yo!", the third action execution processing part 35 determines the winner based on the orientation of the face by the action executed by the game character and the detected orientation of the finger by the action of the player, and causes the game character to execute the third action that corresponds to the determined winner. For example, in the case that the orientation of the face and the orientation of the finger match with each other and the game character loses, the third action execution processing part 35 may cause the game character to execute an action of being chagrined as the third action. For example, in the case that the orientation of the face and the orientation of the finger do not match with each other, the third action execution processing part 35 may cause the game character to execute an action of going ahead to the next round of rock, paper, scissors as the third action.

For example, in the case that the player and the game character execute the playgame of rock, paper, scissors, the third action execution processing part 35 determines the winner based on the shape of the hand by the action executed by the game character and the detected shape of the hand by the action of the player, and causes the game character to execute the third action that corresponds to the determined winner. For example, in the case that the game character wins, the third action execution processing part 35 may cause the game character to execute an action of joy as the third action. For example, in the case that the game character loses, the third action execution processing part 35 may cause the game character to execute an action of being chagrined as the third action. For example, in the case that the result is a draw, the third action execution processing part 35 may cause the game character to execute the action of going ahead to the next round of rock, paper, scissors (such as, for example, "Its a draw!") as the third action.

The processes, etc. effected by the processing parts described hereinabove are not limited to the example of sharing these processes. For example, they may be processed by a smaller number of processing parts (e.g. one processing part) or may be processed by further subdivided processing parts. The functions of the processing parts are implemented by a game program run by a CPU 301 (see FIG. 14 described later). However, for example, some of them may be implemented by an actual device such as a dedicated integrated circuit such as ASIC or FPGA, other electric circuits, etc.

<Specific Examples of Game Screen>

Specific examples of the game screen displayed on the displaying part 5 of the head-mounted display 3 will be described with reference to FIGS. 5A-C to FIGS. 9A-D.

FIGS. 5A-C each show an example of the game screen displayed in the case that the orientation of the finger of the player and the orientation of the face of the game character 19 do not match with each other in "Look that way, yo!". Utterances 37 of the player are each shown on the side of the game screen as a words balloon.

FIG. 5A shows the state before the player starts uttering the words of "Look that way, yo!" or the state of the game character 19 before the utterance of "Look" ends after the start of the utterance. At this time point, the game character 19 does not yet start any action related to the playgame of "Look that way, yo!".

FIG. 5B shows the state of the game character 19 at the time point at which the player starts uttering the words of "Look that way, yo!" and finishes uttering "Look" that is the first portion thereof. At this time point, the game character 19 starts the preparatory action as the first action. In the examples shown in FIG. 5B, the game character 19 executes an action of waiting for being pointed by the player being, for example, thumping and thrilled (an example of the first action). This state continues during the time when "that way" is uttered.

FIG. 5C shows the state of the game character 19 at the time point at which the player utters "yo!". The game character 19 executes the action of moving its face in any one of an upward orientation, a downward orientation, a rightward orientation, and a leftward orientation. In the example shown in FIG. 5C, the game character 19 moves its face in the rightward direction seen from the player and the player points a finger 39 thereof in the leftward direction. In this case, the orientation of the face and the orientation of the finger do not match with each other and the game character 19 thereafter executes the action of going ahead to the next round of rock, paper, scissors (an example of the third action).

FIGS. 6A-D each show an example of the game screen displayed in the case that the orientation of the finger of the player and the orientation of the face of the game character 19 match with each other in "Look that way, yo!".

FIG. 6A and FIG. 6B are same as FIG. 5A and FIG. 5B, and will therefore not again be described.

FIG. 6C shows the state of the game character 19 at the time point at which the player utters "yo!". In the example shown in FIG. 6C, the game character 19 moves its face in the leftward direction seen from the player and the player points the finger 39 thereof in the leftward direction. In this case, the orientation of the face and the orientation of the finger match with each other and the game character 19 is determined as the loser. As shown in FIG. 6D, the game character 19 therefore executes an action that corresponds to the losing (an example of the third action).

FIGS. 7A-D each show an example of the game screen displayed in the case that the player utters the words not to the end thereof in "Look that way, yo!".

FIG. 7A and FIG. 7B are same as FIG. 5A and FIG. 5B, and will therefore not again be described.

FIG. 7C shows the state of the game character 19 displayed in the case that the player only utters "Look that way" and does not thereafter utter "yo!". The example shown in FIG. 7C shows the case that the timing to switch from the preparatory action to the action of moving the face is fixedly set, and the game character 19 executes actions, for example, to the action of moving the face in the rightward direction seen from the player. In this case, the player utters "Look that way, yo!" not to the end thereof and, as shown in FIG. 7D, the game character 19 therefore executes the action of being angry with the player (an example of the second action).

For example, in the case that the switching from the preparatory action to the action of moving the face is executed at the timing of detecting that "y" of "yo!" is uttered, and the like, the preparatory action is not switched to the action of moving the face because "yo!" is not uttered. In this case, the game character 19 may execute the action in FIG. 7D continued directly from the state in FIG. 7B without executing the action in FIG. 7C.

FIGS. 8A-C each show an example of the game screen displayed in the case that the player utters the words to the end thereof in "rock, paper, scissors".

FIG. 8A shows the state of the game character 19 before the player starts uttering the words of "rock, paper, scissor" or before the player finishes uttering "rock" after starting the utterance. At this time point, the game character 19 does not yet start the action related to the playgame of "rock, paper, scissors".

FIG. 8B shows the state of the game character 19 at the time point at which the player starts uttering the words of "rock, paper, scissors" and finishes uttering "rock" that is the first portion of the words. At this time point, the game character 19 starts the preparatory action as the first action. In the example shown in FIG. 8B, the game character 19 executes the action of keeping rhythm by, for example, swinging its hands up and down (an example of the first action). This state is continued during the utterance of "paper".

FIG. 8C shows the state of the game character 19 at the time point of utterance of "scissors" by the player. The game character 19 executes the action of forming the shape of any one of a rock, paper, and scissor using a hand 41 thereof to be given. In the example shown in FIG. 8C, the game character 19 forms the shape of scissors using its hand 41 and gives the hand 41, and the player forms the shape of paper using a hand 43 thereof and gives the hand 41. In this case, the game character 19 is determined as the winner and the game character 19 may therefore execute an action that corresponds to being the winner such as, for example, expressing joy. (an example of the third action). Otherwise, in the case that the playgame of "Look that way, yo!" is executed, the game character 19 may execute the call of "Look that way, yo!" and the action of pointing a finger (an example of the third action).

FIGS. 9A-D each show an example of the game screen displayed in the case that the player utters the words not to the end in "rock, paper, scissors".

FIG. 9A and FIG. 9B are same as FIG. 8A and FIG. 8B and will therefore not again be described.

FIG. 9C shows the state of the game character 19 displayed in the case that the player only utters "rock, paper" and does not thereafter utter "scissors". The example shown in FIG. 9C represents the case that the timing of switching from the preparatory action to the action of forming the shape of a rock, paper, or scissors using the hand and giving the hand is fixedly set, and the game character 19 executes actions up to the action of, for example, forming the shape of scissors using the hand 41 and giving the hand 41. In this case, the player utters "rock, paper, scissors" not to the end thereof and, as shown in FIG. 9D, the game character 19 therefore executes an action of being angry with the player (an example of the second action).

In the case that the switched is executed from the preparatory action to the action of foiniing the shape of a rock, paper, or scissors using the hand and giving the hand at the timing of, for example, detecting the utterance of "sci" of "scissors", the switching to the action of giving the hand is not executed because "scissors" is not yet uttered. In this case, the game character 19 may execute the action in FIG. 9D continued directly from the state in FIG. 9B without executing the action in FIG. 9C.

<Processing Steps Executed by Control Part>

An example of the processing steps executed by the control part 7 will next be described with reference to FIG. 10 and FIG. 11.

As shown in FIG. 10, at step S100, the control part 7 executes a rock-paper-scissors process for the player and the game character 19 to execute the playgame of "rock, paper, scissors". The details of the rock-paper-scissors process will be described later (see FIG. 11).

At step S5, the control part 7 determines whether the player is the winner of the rock-paper-scissors process at step S100. In the case that the player is the winner (step S5: YES), the control part 7 advances to the next step S10.

At step S10, the control part 7 determines whether the player utters "Look" that is the first portion of "Look that way, yo!", using the first utterance determination processing part 25. Step S10 is repeated until the player utters "Look" (step S10:NO) and, in the case that the player utters "Look" (step S10: YES), the control part 7 advances to the next step S15.

At step S15, the control part 7 causes the game character 19 to start the action that corresponds to the playgame of "Look that way, yo!" before the player utters "Look that way, yo!" to the end thereof, using the first action execution processing part 27. This action includes, for example, the preparatory action and the action of moving the face in any one of an upward orientation, a downward orientation, a rightward orientation, and a leftward orientation.

At step S20, the control part 7 recognizes the voice uttered by the player, in parallel to the execution of the action by the game character 19 started at step S15, using the second utterance determination processing part 29.

At step S25, the control part 7 determines whether the player utters "Look that way, yo!" to the end thereof, using the second utterance determination processing part 29. In the case that "Look that way, yo!" is uttered not to the end thereof (step S25: NO), the control part 7 moves to step S30.

At step S30, the control part 7 causes the game character 19 to execute an action of being angry with the player, using the second action execution processing part 31. The control part 7 thereafter moves to step S80 described later.

On the other hand, at step S25, in the case that "look that way, yo!" is uttered to the end thereof (step S25: YES), the control part 7 moves to step S35.

At step S35, the control part 7 detects the hand action of the player (in which one of an upward direction, a downward direction, a rightward direction, and a leftward direction the finger 39 points), using the action detection processing part 33.

At step S40, the control part 7 determines whether the orientation of the finger of the player and the orientation of the face of the game character 19 match with each other, based on the content of the action executed by the game character 19 and the hand action of the player detected at step S35, using the third action execution processing part 35. In the case that the orientations do not match with each other (step S40: NO), the control part 7 returns to the first step S100. On the other hand, in the case that the orientations match with each other (step S40: YES), the control part 7 moves to the next step S45.

At step S45, the control part 7 determines the player as the winner using the third action execution processing part 35.

At step S50, the control part 7 causes the game character 19 to execute the action that corresponds to the losing such as, for example, being chagrined, using the third action execution processing part 35. The control part 7 thereafter moves to step S80 described later.

In the case that the game character 19 is determined as the winner in the rock-paper-scissors process at step S100, at step S5 (step S5:NO), the control part 7 moves to the next step S55.

At step S55, the control part 7 causes the game character 19 to execute the call of "Look that way, yo!" and the action of pointing a finger in any one of an upward orientation, a downward orientation, a rightward orientation, and a leftward orientation.

At step S60, the control part 7 detects in which one of an upward direction, a downward direction, a rightward direction, and a leftward direction the face of the player is oriented, using the action detection processing part 33.

At step S65, the control part 7 determines whether the orientation of the finger of the game character 19 and the orientation of the face of the player match with each other, based on the content of the action executed by the game character 19 and the orientation of the face of the player detected at step S60. In the case that the orientations do not match with other (step S65:NO), the control part 7 returns to the first step S100. On the other hand, in the case that the orientations match with each other (step S65: YES), the control part 7 moves to the next step S70.

At step S70, the control part 7 determines the game character 19 as the winner.

At step S75, the control part 7 causes the game character 19 to execute the action that corresponds to the winning such as, for example, expressing joy.

At step S80, the control part 7 determines whether the playgame of "Look that way, yo!" is executed once more. In the case that the playgame of "Look that way, yo!" is executed once more based on execution of a predetermined rerunning operation by the player, or the like (step S80: YES), the control part 7 returns to the first step S100. On the other hand, in the case that the playgame of "Look that way, yo!" is terminated based on execution of a predetermined termination operation by the player, or the like (step S80: NO), the control part 7 terminates the processing for this flowchart.

FIG. 11 shows an example of the detailed steps of the rock-paper-scissors process at step S100.

As shown in FIG. 11, at step S110, the control part 7 determines whether "rock" that is the first portion of "rock, paper, scissors" is uttered the player, using the first utterance determination processing part 25. Step S110 is repeated until "rock" is uttered (step S110:NO) and, in the case that "rock" is uttered (step S110: YES), the control part 7 moves to the next step S120.

At step S120, the control part 7 causes the game character 19 to start the action that corresponds to the playgame of "rock, paper, scissors" before "rock, paper, scissors" is uttered to the end thereof, using the first action execution processing part 27. This action includes, for example, the preparatory action and the action of forming the shape of a rock, paper, or scissors using the hand to be given.

At step S130, the control part 7 recognizes the voice uttered by the player in parallel to the execution of the action by the game character 19 started at step S120, using the second utterance determination processing part 29.

At step S140, the control part 7 determines whether "rock, paper, scissors" is uttered by the player to the end thereof, using the second utterance determination processing part 29. In the case that "rock, paper, scissors" is uttered not to the end thereof (step S140:NO), the control part 7 moves to step S150.

At step S150, the control part 7 causes the game character 19 to execute the action of being angry with the player, using the second action execution processing part 31. The control part 7 thereafter moves to step S80 in FIG. 10.

On the other hand, in the case that "rock, paper, scissors" is uttered to the end thereof at step S140 (step S140: YES), the control part 7 moves to step S160.

At step S160, the control part 7 detects the hand action (which of the shapes of a rock, paper, and scissors the hand 43 takes) of the player, using the action detection processing part 33.

At step S170, the control part 7 determines the winner based on the shape of the hand formed by the action executed by the game character 19 and the shape of the hand formed by the hand action of the player detected at step S160, using the third action execution processing part 35.

At step S180, the control part 7 determines whether the result of the determination is a draw. In the case that the result is a draw (step S180: YES), the control part 7 returns to the first step S110. On the other hand, in the case that the result is not a draw (step S180:NO), the control part 7 terminates this routine and moves to step S5 in FIG. 10.

The process procedure described above is a mere example. At least some processes of the procedure may be deleted or changed, or other processes other than the above may be added. The order of at least some processes of the procedure may be changed. The plural processes may be integrated into a single process.

<Effects of Embodiment>

As above, the game program of this embodiment (an example of a voice user interface program) causes the control part 7 of the head-mounted display 3 to function as the first utterance determination processing part 25 that determines whether the first portion of the words set in advance is uttered by the player, the first action execution processing part 27 that executes the first process corresponding to the words before the words are uttered to the end thereof in the case that it is determined that the first portion of the words is uttered, the second utterance determination processing part 29 that determines whether the words are uttered by the player to the end thereof in parallel to the execution of the first process, and the second action execution processing part 31 that executes the second process based on the result of determining whether the words are uttered to the end thereof.

In this embodiment, in the case that it is determined that the first portion of the words is uttered, the first action execution processing part 27 may cause the game character to start the first action that corresponds to the words as the first process before the words are uttered to the end thereof and, in the case that it is determined that the words are uttered not to the end thereof, the second action execution processing part 31 may cause the game character to execute the second action different from the first action as the second process.

A game system having a voice input function generally recognizes the voice uttered by the player as words and causes the game character to execute an action that corresponds to the content of the recognized words, and the communication between the player and the game character is thereby established. It is therefore necessary to wait for the utterance of the player to end while, in the case of communication in which, for example, the utterance and the action are concurrently executed, the action of the game character is delayed and the communication may become unnatural.

In the game program of this embodiment, in the case that the first portion of the words set in advance is uttered by the player, the game character 19 is caused to start the first action that corresponds to the words before the words are uttered to the end thereof. The game character 19 can thereby be caused to start the action that corresponds to the assumed content of the words at the timing of the utterance of the first portion of the words by the player. In this manner, the game character 19 can be caused to immediately start the action that corresponds to the words before the player finishes uttering the words. The game character 19 can therefore be caused to execute the action concurrently with the utterance of the player. Occurrence of any delay of the action by the game character 19 can therefore be suppressed.

On the other hand, the case that the player utters the words set in advance not to the end thereof can also be assumed such as, for example, that the player discontinues the utterance before the end of the words or that the player utters words different from the set words for the rest of the words. In this case, the execution of the first action can be recovered to avoid being unnatural by causing the game character 19 to execute the second action different from the first action. Natural communication that concurrently is in real time and interactive can thereby be established between the player and the game character 19.

In the case that the game character 19 is hastily caused to execute the first action and the player eventually does not utter the overall words, the second action is added to be a process to recover. Any complicated process is thereby unnecessary such as, for example, finely dividing the voice to execute the voice recognition process to avoid any discrepancy between the content of the utterance of the player and the content of the action of the game character 19, or checking the consistency for each of the divided words. Therefore, the processing load can be reduced and the processing speed can be improved.

In this embodiment, the control part 7 may further be caused to function as the action detection processing part 33 that detects the actions of the player, and the third action execution processing part 35 that, in the case that it is determined that the words are uttered to the end thereof, determines a third action based on the content of the first action executed by the game character 19 and the content of the detected action of the player, and that causes the game character 19 to execute the third action.

In this case, the next action can be determined taking into consideration the content of the action executed by the game character 19 and the content of the action of the player, and the game character 19 can be caused to execute this action. In the case that the player utters the words set in advance to the end thereof, natural communication can thereby be smoothly continued between the player and the game character 19 without inserting any process for the utterance error like the second action.

In this embodiment, the first utterance determination processing part 25 may determine whether the player utters the first portion of the words that represent the playgame for the player and the game character 19 to compete to win, the first action execution processing part 27 may, in the case that it is determined that the player utters the first portion of the words, cause the game character to start the action for the playgame before the player utters the words to the end thereof, the second utterance determination processing part 29 may determine whether the player utters the words to the end thereof, in parallel to the execution of the action for the playgame, and the third action execution processing part 35 may, in the case that it is determined that the player utters the words to the end thereof, determine the winner based on the content of the action for the play game executed by the game character 19 and the content of the detected action of the player and may cause the game character 19 to execute the third action that corresponds to the result of determining the winner.

In this case, the playgame to compete to win can be executed in real time and interactively between the player and the game character 19.

In this embodiment, the second action execution processing part 31 may cause the game character 19 to execute the action of being angry with the player as the second action.

In this case, in the case, for example, that the player discontinues the utterance before finishing the words or that the player utters a word different from the assumed word in the rest of the words, the game character 19 can be caused to get angry. The reality of the communication executed between the player and the game character 19 can thereby be improved.

In this embodiment, the first utterance determination processing part 25 may determine whether the player utters the first portion of the words of "Look that way, yo!", the first action execution processing part 27 may, in the case that it is determined that the player utters the first portion of "Look that way, yo!", cause the game character 19 to start the action for the playgame of "Look that way, yo!" before the player utters "Look that way, yo!" to the end thereof, the second utterance determination processing part 29 may determine whether the player utters the words of "Look that way, yo!" to the end thereof in parallel to the execution of the action for the playgame of "Look that way, yo!", the second action execution processing part 31 may, in the case that it is determined that the player utters the words of "Look that way, yo!" not to the end thereof, cause the game character 19 to execute the second action, and the third action execution processing part 35 may, in the case that it is determined that the player utters the words of "Look that way, yo!" to the end thereof, determine the winner based on the orientation of the face by the action executed by the game character 19 and the detected orientation of the finger by the action of the player and may cause the game character 19 to execute the third action that corresponds to the result of determining the winner.

In this case, the playgame of "Look that way, yo!" can be executed in real tie and interactively between the player and the game character 19.

In this embodiment, the first utterance determination processing part 25 may determine whether the player utters the first portion of the words of "rock, paper, scissors", the first action execution processing part 27 may, in the case that it is determined that the player utters the first portion of "rock, paper, scissors", cause the game character 19 to start the action for the playgame of "rock, paper, scissors" before the player utters "rock, paper, scissor" to the end thereof, the second utterance determination processing part 29 may determine whether the player utters the words of "rock, paper, scissors" to the end thereof in parallel to the execution of the action for the playgame of "rock, paper, scissors", the second action execution processing part 31 may, in the case that it is determined that the player utters the words of "rock, paper, scissors" not to the end thereof, cause the game character 19 to execute the second action, and the third action execution processing part 35 may, in the case that it is determined that the player utters the words of "rock, paper, scissors" to the end thereof, determine the winner based on the shape of the hand by the action executed by the game character 19 and the detected shape of the hand by the action of the player, and may cause the game character 19 to execute the third action that corresponds to the result of determining the winner.

In this case, the playgame of "rock, paper, scissors" can be executed in real time and interactively between the player and the game character.

(Modification Example)

The present invention is not limited to the embodiment and is capable of various modifications within a range not departing from the gist and technical idea thereof.

The case has been described above that, for example, the playgames of "Look that way, yo!" and "rock, paper, scissors" are executed between the player and the game character to communicate with each other while the type of the communication is not limited only when at least a portion of the voices and a portion of the actions are concurrently executed. In addition, a playgame may be executed such as, for example, "One! Two! Three!" in which a player and a game character each hold none, one, or two of its thumbs upright and compete to win as to whether the player or the game character can guess the total number (zero to four) of the thumb(s). In this case, in the case, for example, that "One!" that is the first portion of "One! Two! Three!" is uttered, the game character 19 may be caused to start the action for the playgame of "One! Two! Three!" before "One! Two! Three!" is uttered to the end thereof.

The case has been described above that the player and the game character communicate with each other one for one while, in the case that, for example, the playgame of "rock, paper, scissors" or "One! Two! Three!" is played, at least the player or the game character may be set to be plural. In the case that plural players are present, the control parts 7 of the head-mounted displays 3 of the players only have to communicate with each other to share thereamong the result of detecting the hand action of each of the players. Winning or losing of the game character and each of the players only has to thereby be determined. In the case that plural game characters are present, each of the game characters only has to be independently controlled to cause each of the game characters to individually execute an action.

The case has been described above that the player wears the head-mounted display 3 that is a displaying device realizing what-is-called MR and executes a gameplay while the type of the gaming machine is not limited to the head-mounted display only when the gaming machine has the voice input function and the hand action detection function. For example, as shown in FIG. 12, the gaming machine may be a game system 1A that includes an information processing device 45, a game controller 47, a displaying device 49, a microphone 51, a camera 53, and the like. The game controller 47, the displaying device 49, the microphone 51, and the camera 53 are each communicably connected to the information processing device 45 by wire or by air.

The information processing device 45 is, for example, a stationary gaming machine, is not however limited to this, and may be, for example, a portable gaming machine incorporating therein an input part, a displaying part, and the like. In addition to a gaming machine, the information processing device 45 may be, for example, a device that is manufactured, sold, and the like as a computer such as a server computer, a desktop computer, a notebook computer, or a tablet computer, or may be a device that is manufactured, sold, and the like as a telephone such as a smartphone, a mobile phone, or a phablet.

The player executes various types of operational input using the game controller 47. The microphone 51 inputs a voice uttered by the player. The camera 53 detects the orientation of the head portion of the player, the shape of a hand, an action of a hand, and the like. The microphone 51 or the camera 53 may be disposed as an individual device as shown in FIG. 12, or may be incorporated in the information processing device 45, the game controller 47, or the displaying device 49.

For example, as shown in FIG. 13, the gaming machine may be a game system 1B (not shown) that includes a smartphone 55. The smartphone 55 (an example of the information processing device) includes a touch panel 57 on which various types of display and various types of input operation by the player are executed, and has a voice input function and a camera function capable of detecting hand actions.

The case that the voice user interface program of the present invention is a game program has been described above as an example, and the voice user interface program of the present invention is however not limited to a game program. In the case, for example, that the information processing device is one of various types of device each having a voice recognition function, such as a car navigation device, an automatic ticket vending machine at a railway station, a restaurant, or the like, an automatic vending machine, an ATM at a financial institution, or an OA machine such as a copying machine or a facsimile machine, the voice user interface program may be a voice user interface program that is applied to such a device.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present invention.

<Hardware Configuration of The Control Part>

An exemplary hardware configuration will be described for the control part 7 of the head-mounted display 3 achieving the processing parts implemented by a program executed by the CPU 301 described above, with reference to FIG. 14. The information processing device 45 or the smartphone 55 may be have the same hardware configuration.

As shown in FIG. 14, t the control part 7 has the circuitry including a CPU 301, a ROM 303, a RAM 305, a GPU 306, a dedicated integrated circuit 307 constructed for specific use such as an ASIC or an FPGA, an input device 313, an output device 315, a storage device 317, a drive 319, a connection port 321, and a communication device 323. These constituent elements are mutually connected via a bus 309 and an input/output (I/O) interface 311 such that signals can be transferred.

The game program (an example of a voice user interface program) can be recorded in a ROM 303, the RAM 305, and the storage device 317 such as a hard disk device, for example.

The game program can also temporarily or permanently (non-transitory) be recorded in a removable recording medium 325 such as magnetic disks including flexible disks, various optical disks including CDs, MO disks, and DVDs, and semiconductor memories. The recording medium 325 as described above can be provided as so-called packaged software. In this case, the game program recorded in the recording medium 325 may be read by the drive 319 and recorded in the storage device 317 through the I/O interface 311, the bus 309, etc.

The game program may be recorded in, for example, a download site, another computer, or another recording medium (not shown). In this case, the game program is transferred through a network NW such as a LAN or the Internet and the communication device 323 receives this program. The program received by the communication device 323 may be recorded in the storage device 317 through the I/O interface 311, the bus 309, etc.

The game program may be recorded in appropriate external connection device 327, for example. In this case, the game program may be transferred through the appropriate connection port 321 and recorded in the storage device 317 through the I/O interface 311, the bus 309, etc.

The CPU 301 executes various process in accordance with the program recorded in the storage device 317 to implement the voice recognition processing part 23, the first utterance determination processing part 25, the first action execution processing part 27, the second utterance determination processing part 29, the second action execution processing part 31, the action detection processing part 33, and the third action execution processing part 35, etc. In this case, the CPU 301 may directly read and execute the program from the storage device 317 or may be execute the program once loaded in the RAM 305. In the case that the CPU 301 receives the program through, for example, the communication device 323, the drive 319, or the connection port 321, the CPU 301 may directly execute the received program without recording in the storage device 317.

The CPU 301 may execute various processes based on a signal or information input from the input device 313 such as the game controller, a mouse, a keyboard, and a microphone as needed.

The GPU 306 executes processes for displaying images such as a rendering processing based on a command of the CPU 301.

The CPU 301 and the GPU 306 may output a result of execution of the processes described above from the output device 315 such as the displaying part 5 of the head-mounted display 3, for example. And the CPU 301 and the GPU 306 may transmit this process result to the communication device 323 or the connection port 321 as needed or may record the process result into the storage device 317 or the recording medium 325.

What is claimed is:

1. A voice user interface processing method executed by an information processing device, the voice user interface processing method comprising:
   determining whether a first portion of words set in advance is uttered by a player by using the information processing device to execute a voice recognition process of a voice of the player inputted from a voice input device;
   executing a first process that corresponds to the words before the words are uttered to an end of the words in a case that it is determined that the first portion of the words is uttered, wherein the executing the first process comprises, in a case that it is determined that the first portion of the words is uttered, causing a game character to start a first action that corresponds to the words as the first process before the words are uttered to the end of the words;
   determining whether or not the words are uttered by the player to the end of the words in parallel to an execution of the first process by using the information processing device to execute the voice recognition process of the voice of the player inputted from the voice input device; and
   executing a second process based on a result of determining whether or not the words are uttered to the end of the words, wherein the executing the second process comprises, in a case that it is determined that the words are not uttered to the end of the words, causing the game character to execute a second action that is different from the first action as the second process,
   wherein the voice user interface processing method further comprises:
   determining whether or not the first portion of words set in advance is uttered by the player after causing the game character to execute the second action, executing processes of the voice user interface processing method once more in a case that it is determined that the first portion of words set in advance is uttered by the player after causing the game character to execute the second action, and terminating an execution of the processes of the voice user interface processing method in a case that it is determined that the first portion of words set in advance is not uttered by the player after causing the game character to execute the second action.

2. The voice user interface processing method according to claim 1, further comprising:

detecting an action of the player, wherein the executing the second process comprises, in a case that it is determined that the words are uttered to the end of the words, determining a third action based on a content of the first action executed by the game character and a content of a detected action of the player and causing the game character to execute the third action, as the second process.

3. The voice user interface processing method according to claim 2, wherein the executing the second process comprises causing the game character to execute an action of being angry with the player as the second action.

4. A voice user interface processing method executed by an information processing device, the voice user interface processing method comprising:

determining whether a first portion of words set in advance is uttered by a player by using the information processing device to execute a voice recognition process of a voice of the player inputted from a voice input device;

executing a first process that corresponds to the words before the words are uttered to an end of the words in a case that it is determined that the first portion of the words is uttered, wherein the executing the first process comprises, in a case that it is determined that the first portion of the words is uttered, causing a game character to start a first action that corresponds to the words as the first process before the words are uttered to the end of the words;

determining whether or not the words are uttered by the player to the end of the words in parallel to an execution of the first process by using the information processing device to execute the voice recognition process of the voice of the player inputted from the voice input device;

detecting an action of the player; and executing a second process based on a result of determining whether or not the words are uttered to the end of the words, wherein the executing the second process comprises, in a case that it is determined that the words are not uttered to the end of the words, causing the game character to execute a second action that is different from the first action as the second process, wherein the executing the second process comprises, in a case that it is determined that the words are uttered to the end of the words, determining a third action based on a content of the first action executed by the game character and a content of a detected action of the player and causing the game character to execute the third action, as the second process, wherein the determining whether the first portion of the words is uttered by the player comprises determining whether the first portion of the words representing a playgame in which the player and the game character compete to win is uttered by the player, wherein the executing the first process comprises, in a case that it is determined that the first portion of the words is uttered, causing the game character to start an action for the playgame as the first process before the words are uttered to the end of the words, wherein the determining whether the words are uttered by the player to the end of the words comprises determining whether the words are uttered by the player to the end of the words in parallel to an execution of the action for the playgame, and wherein the executing the second process comprises, in a case that it is determined that the words are uttered to the end of the words, determining a winner based on a content of the action for the playgame executed by the game character and a content of a detected action of the player and causing the game character to execute the third action that corresponds to a result of determining the winner, as the second process.

5. The voice user interface processing method according to claim 1, wherein the executing the second process comprises causing the game character to execute an action of being angry with the player as the second action.

6. The voice user interface processing method according to claim 4, wherein the determining whether the first portion of the words is uttered by the player comprises determining whether a first portion of words of "Look that way, yo!" is uttered by the player, wherein the executing the first process comprises, in a case that it is determined that the first portion of the "Look that way, yo!" is uttered, causing the game character to start an action for a playgame of the "Look that way, yo!" before the "Look that way, yo!" is uttered to an end of the "Look that way, yo!", wherein the determining whether the words are uttered by the player to the end of the words comprises determining whether the words of the "Look that way, yo!" are uttered by the player to the end of the "Look that way, yo!" in parallel to an execution of the action for the playgame of the "Look that way, yo!", and wherein the executing the second process comprises, in a case that it is determined that the words of the "Look that way, yo!" are not uttered to the end of the "Look that way, yo!", causing the game character to execute the second action, and comprises, in a case that it is determined that the words of the "Look that way, yo!" are uttered to the end of the "Look that way, yo!", determining a winner based on an orientation of a face by the action executed by the game character and a detected orientation of a finger by an action by the player and causing the game character to execute the third action that corresponds to a result of determining the winner.

7. The voice user interface processing method according to claim 4, wherein the determining whether the first portion of the words is uttered by the player comprises determining whether a first portion of words of "rock, paper, scissors" is uttered by the player, wherein the executing the first process comprises, in a case that it is determined that the first portion of the words of the "rock, paper, scissors" is uttered, causing the game character to start an action for the playgame of the "rock, paper, scissor" before the "rock, paper, scissors" are uttered to an end of the "rock, paper, scissor",
wherein the determining whether the words are uttered by the player to the end of the words comprises determining whether the words of the "rock, paper, scissors" are uttered by the player to the end of the "rock, paper, scissors" in parallel to an execution of the action for the playgame of the "rock, paper, scissors", and
wherein the executing the second process comprises, in a case that it is determined that the words of the "rock, paper, scissors" are not uttered to the end of the "rock, paper, scissors", causing the game character to executed the second action, and comprises, in a case that it is determined that the words of the "rock, paper, scissors" are uttered to the end of the "rock, paper, scissors", determining a winner based on a shape of a hand by the action executed by the game character and a detected shape of a hand by an action of a player and causing the game character to execute the third action that corresponds to a result of determining the winner.

8. The voice user interface processing method according to claim 4,
wherein the executing the second process comprises causing the game character to execute an action of being angry with the player as the second action.

9. A non-transitory recording medium readable by an information processing device, the recording medium storing a voice user interface program programmed to cause the information processing device to:
determine whether a first portion of words set in advance is uttered by a player by using the information processing device to execute a voice recognition process of a voice of the player inputted from a voice input device;
execute a first process that corresponds to the words before the words are uttered to an end of the words in a case that it is determined that the first portion of the words is uttered, wherein the executing the first process comprises, in a case that it is determined that the first portion of the words is uttered, causing a game character to start a first action that corresponds to the words as the first process before the words are uttered to the end of the words;
determine whether or not the words are uttered by the player to the end of the words in parallel to an execution of the first process by using the information processing device to execute the voice recognition process of the voice of the player inputted from the voice input device; and
execute a second process based on a result of determining whether or not the words are uttered to the end of the words, wherein the executing the second process comprises, in a case that it is determined that the words are not uttered to the end of the words, causing the game character to execute a second action that is different from the first action as the second process,
wherein the voice user interface program is programmed to further cause the information processing device to:
determine whether or not the first portion of words set in advance is uttered by the player after causing the game character to execute the second action,
execute processes of the voice user interface program once more in a case that it is determined that the first portion of words set in advance is uttered by the player after causing the game character to execute the second action, and
terminate an execution of the processes of the voice user interface program in a case that it is determined that the first portion of words set in advance is not uttered by the player after causing the game character to execute the second action.

\* \* \* \* \*